United States Patent [19]

Journey

[11] 4,301,397
[45] Nov. 17, 1981

[54] DC ANTENNA ROTATOR SYSTEM

[75] Inventor: J. Craig Journey, Fuquay-Varina, N.C.

[73] Assignee: Cornell-Dubilier Electric Corporation, Newark, N.J.

[21] Appl. No.: 143,459

[22] Filed: Apr. 24, 1980

[51] Int. Cl.³ .............................................. G05B 11/32
[52] U.S. Cl. ................................. 318/625; 318/16; 318/99; 318/112
[58] Field of Search ................ 318/112, 375, 16, 625, 318/99

[56] References Cited

U.S. PATENT DOCUMENTS

| | | | |
|---|---|---|---|
| Re. 26,404 | 6/1968 | Lunn et al. | 318/675 X |
| 2,861,235 | 11/1958 | Chadowski et al. | 318/675 |
| 3,102,218 | 8/1963 | Dicke | 318/112 X |
| 3,197,683 | 7/1965 | Bennett et al. | 318/16 |
| 3,667,024 | 5/1972 | Deming | 318/674 |
| 4,056,763 | 11/1977 | Debrie et al. | 318/675 |
| 4,077,000 | 2/1978 | Grubbs | 318/675 X |
| 4,112,343 | 9/1978 | Douglas | 318/674 |
| 4,131,839 | 12/1978 | Springer | 318/675 |

*Primary Examiner*—B. Dobeck
*Attorney, Agent, or Firm*—Ronald R. Stanley

[57] ABSTRACT

Rotary positioning of an antenna is provided from a remote control apparatus using a first reversible motor at the antenna and a second reversible motor at the control. A rotary switch at the control is coupled mechanically and electrically to the control motor such that movement of the rotary switch energizes both the antenna and control motors, which have substantially identical speed characteristics. When the antenna has attained the desired position, the system de-energizes itself. Mechanical resistance to movement of the antenna is simulated by a feedback motor mechanically coupled to the control motor and electrically connected in series with the antenna motor. The system contemplates use of direct current motors and a two wire connection between the antenna and the remote control apparatus.

12 Claims, 5 Drawing Figures

DC ANTENNA ROTATOR SYSTEM

BACKGROUND OF THE INVENTION

The present invention is related to control systems for the rotary positioning of a remote antenna from a control apparatus positioned conveniently relative to an operator and is described with particular reference thereto, however the remote positioning of any type of device is contemplated within the precepts of the present invention.

Antenna rotators presently enjoy considerable acceptance among operators of citizen band base stations and ham-amateur radios. To some extent, TV viewers and TM radio listeners in fringe reception areas also find the use of rotators beneficial. These rotator systems standardly include a motor arrangement mounted remotely on a tower, roof or other raised support with the antenna, in turn, mounted to the motor for rotation therewith relative to the support. Conveniently located near the TV or radio equipment is a control console which generally includes a manually actuated switch for controlling positioning of the antenna through operation of the remote motor.

It is desirable that an operator know of the position of the remote antenna and for this reason the control console generally includes an indicator which may take the form of a rotary dial. This rotary dial is moved to a position corresponding to the desired position of the antenna, and the system functions to bring the antenna into alignment with the indicator. Generally, the antenna motor is capable of rotating through only one complete revolution as a result of structural limitations such as electrical connections. The two extremes of the 360° of travel are customarily indicated at the control console by limit switches at the antenna. Connection of the console to the remote antenna is accomplished by a multiconductor cable.

Control of the antenna position has most often been accomplished through use of electrical circuitry involving bridges and DC-balance. When the indicator and antenna are correspondingly positioned, the bridge is in balance. Various methods may be used to turn off control of the antenna motor once balance is reached, or more precisely, as close to balance as possible. Generally, the antenna has passed the balance position before power can be disconnected, and reverse operation is required to obtain true balance. Reverse operation of the antenna motor agains results in the balancing position being overrun, although to a smaller degree than the initial operation. Subsequent reversing operations of the motor result in increasingly smaller overruns until, eventually, balance is attained. Commercially accepted units have approximated balance in the above scheme by disconnecting the antenna motor power at one of the earlier "balance" indications and accepting the relatively small overrun error corresponding therewith.

SUMMARY OF THE INVENTION

The present invention provides a control system for positioning a remote antenna wherein two motors, having matched speed characteristics are respectively positioned at a control console local to an operator and at the remote antenna, are energized on demand in parallel by a single power source. By noting the relative position of the control console motor, the corresponding position of the antenna motor is known since the two equally excited motors rotate equally during any given period of time. Loading of the antenna motor as a result of resistance on the antenna is accommodated by correspondingly loading the control motor.

In accordance with a preferred embodiment of the present invention, an antenna rotator system has two direct-current operated motors connected in an electrically parallel circuit respectively located at a control console and a remote antenna. The two motors have substantially identical speed characteristics such that knowledge of the position of one of the motors, the control motor, directly imparts knowledge of the position of the other motor, the antenna motor. Variations in the speed of the antenna motor due to mechanical loading of the antenna are adjusted for through a feedback generator transforming electrical loading information from the antenna motor to mechanical loading of the control motor.

A primary object of the present invention is the provision of an antenna rotator system using a remote antenna motor and a local control motor having identical speed characteristics which motors are commonly electrically excited in parallel to provide constant knowledge of the position of the antenna motor through corresponding knowledge of the position of the control motor.

A further object of the present invention is the provision of an antenna rotator system in which a feedback generator uses electrical information from a remote antenna motor to simulate mechanical loading of the antenna at a control console motor wherein the motors have identical speed characteristics when commonly excited.

Still a further object of the present invention is the provision of an antenna rotator system which incorporates direct-current operated motors at a remote antenna and local control console, respectively, and which allows two wire connection between the local control console and the remote antenna.

The foregoing and other novel features, objects and advantages are better appreciated from the following detailed description of illustrated embodiments shown in the accompanying drawings.

DETAILED DESCRIPTION OF PREFERRED EMBODIMENTS

Figure 1:
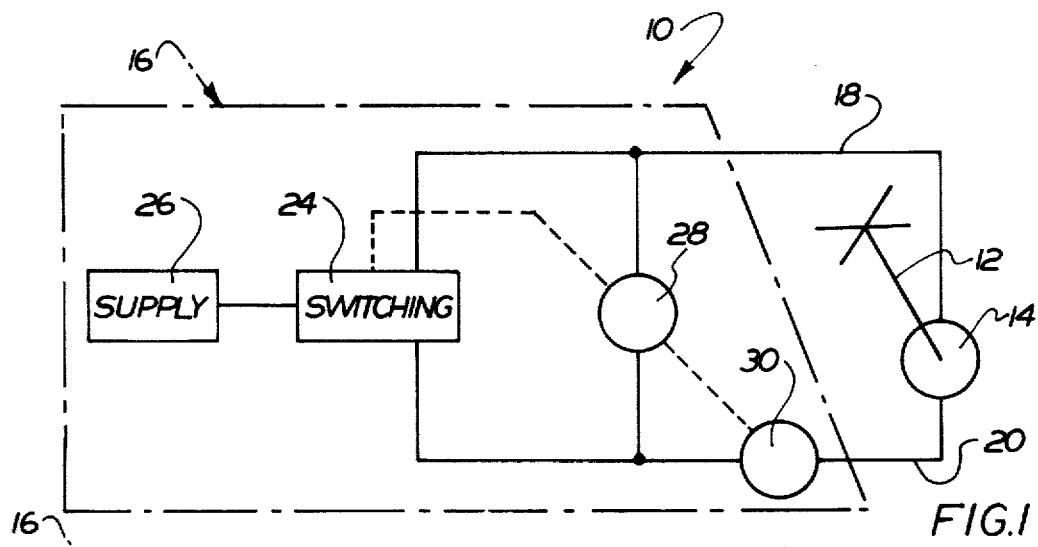
FIG. 1 is a partial block diagram, partial schematic diagram generally illustrating the present invention.

Referring now to FIG. 1, a remote antenna control system 10 is shown in block diagram. A remote antenna 12 of any desired conventional design is appropriately positioned at a tower, platform or other raised structure (not shown) and mounted relative to an antenna motor 14 as for example by being secured directly to an output shaft. Positioned locally relative to an operator and signal receiver (not shown) is a control console 16 offset by a dash-dot line. Motor 14 is connected to control console 16 by electrical leads 18 and 20, which may include appropriate plug in connectors (not shown) for assembly of system 10.

Control console 16 includes a switching arrangement 24 which connects system 10 to a power supply 26 and effects movement of antenna 12 though operation of motor 14. Switching arrangement 24 is mechanically and electrically coupled to a control motor 28 which is arranged to be in electrical parallel connection with motor 14 and the power supplied through the switching arrangement. Antenna motor 14 and control motor 28 are selected to have substantially identical speed characteristics such that, for any particular length of time that power is supplied to the motors, the speed of rotation and length of arc travel is identical. Additionally, antenna motor 14 must have sufficient torque capabilities to enable antenna 12 to be rotated thereby.

Generally, the construction of antenna rotators allows the antenna to rotate through only one full revolution of 360° and therefore the motors used must be reversible. This limitation is imposed by the necessary electrical connection between the antenna and the receiver which would become tangled if the antenna revolved more than one complete turn. Reversibility of the motors additionally requires equal speed characteristics in the two directions for each of motors 14 and 28.

Operation of system 10 is initiated by selecting a desired position for the antenna by re-aligning switching arrangement 24. Control motor 28 and antenna motor 14 are jointly energized by power supply 26 through the switching arrangement. While motor 14 rotates the antenna, control motor 28 rotates correspondingly and disconnects power when the desired rotary position selected by switching arrangement 24 has been reached by the antenna.

Clearly, rotation of antenna 12 is effected by various physical resistances, such as for example wind. These resistances on the antenna translate into counter-torque at antenna motor 14. While in one instance the wind or other resistive factor restrains the antenna, resulting in the torque necessary to turn the antenna increasing; in another instance the resistive factors could effectively assist in rotating the antenna, resulting in decreasing the torque required for rotation. Such counter-torques at antenna motor 14 result in differential positioning between the antenna motor and control motor 28 if the resultant error is not rectified.

The instantaneous current required to operate motor 14 is directly related to the torque produced by the motor. Correction of counter-torque at antenna motor 14 is obtained through use of a feedback system which continuously gathers current information from the antenna motor and effects the operation of control motor 28 therewith. In the preferred embodiment of the invention, a feeback, generator or reactance motor 30 is utilized to obtain the feedback of instantaneous currents from antenna motor 14. By electically connecting an armature of feedback motor 30 in series with the antenna motor, the operation of the feedback motor is directly related to instantaneous current and torque of antenna motor 14. Feedback motor 30 and control motor 28 are then mechanically coupled such as through direct attachment of the output shafts thereof together. Mechanical connection of the feedback motor, control motor and switching arrangement is indicated in FIG. 1 by the dotted line. The feedback motor is obviously physically located within control console 16.

In order for feedback motor 30 to provide accurate loading of motor 28, it is imperative that the current versus torque characteristics of antenna motor 14 and the feedback motor be similar. Further, the speed versus torque characteristics of control motor 28 and feedback motor 30 must be substantially alike.

As a result of the use of feedback motor 30, current energization of the feedback motor, which is directly related to variations in the torque output required of motor 14, directly effects the rotation of motor 28. It is to be understood that feedback means other than motor 30 are contemplated and the connection with control motor 28 is capable of being electrical in nature rather than mechanical.

Figure 2:
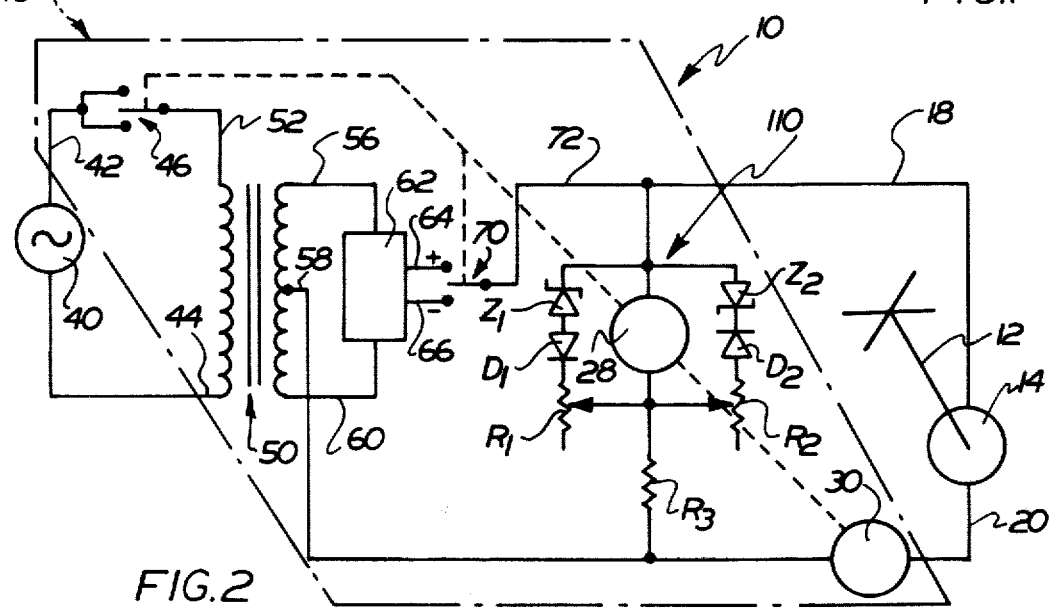
FIG. 2 is an electrical schematic diagram illustrating one embodiment of the present invention.

While either alternating or direct current operation of system 10 is contemplated, in keeping with the goal of minimizing the number of electrical conductors required to connect the remote portions of the system to the control console, direct-current is preferred. FIG. 2 illustrates the construction of system 10 for direct-current operation wherein only two conductors, 18 and 20, are required between the console and motor 14. Control console 16 is required to be connected to a conventional alternating current source 40 such as normal AC service providing 115 volts at 60 cycles per second. For purposes of the console, connection to the source may comprise a standard plug inserted into a wall receptable (not shown) through electrical leads 42 and 44.

Switching arrangement 24 (FIG. 1) includes an on-off switch 46 which in FIG. 2 connects the console to power source 40 through lead 42. When switch 46 makes contact due to actuation of the switching arrangement, the power supply is connected to the input of a transformer 50 by a switch lead 52 and lead 44. Transformer 50 has three output leads 56, 58, 60 respectively related to AC voltage, common and AC voltage. The value of the AC voltage output is not critical by itself, but must be matched to the rated input voltages of motors 14, 28 and 30. In the embodiment shown in FIG. 2, the transformer was selected to provide a direct-current voltage, after rectification, of 15 volts. Output leads 56 and 60 of the transformer are connected to the input of a full wave rectifier circuit 62 which provides positive DC voltage at a first output terminal 64 and negative DC voltage at a second output terminal 66. A direction switch 70, which is mechanically coupled to switch 46, connects either positive or negative DC voltage to motors 14, 28 and 30 through a lead 72 depending on the position of the wiper of switch 70.

Control motor 28 is arranged to have its armature connected across leads 58 and 72. As noted above, the armatures of antenna motor 14 and feedback motor 30 are connected in series by lead 20. While the remaining armature lead of motor 30 is connected to lead 58 and thus one lead of motor 28, lead 18 from the remaining armature lead of motor 14 is connected to lead 72 and thus to the second lead of motor 28.

Figure 5:
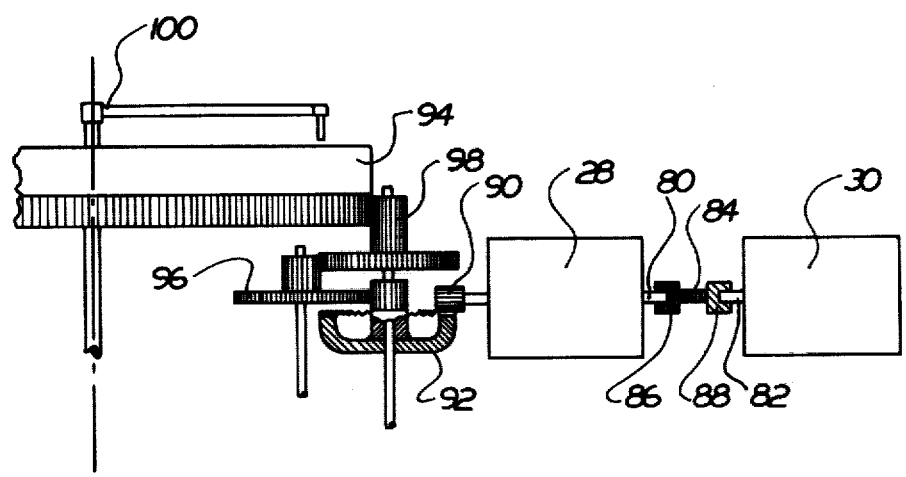
FIG. 5 is a front view of a portion of a control console for operating an antenna rotator system in accordance with the invention.

As mentioned above, an output shaft 80 of control motor 28 and an output shaft 82 of feedback motor 30 are mechanically coupled together by any suitable means. One arrangement for attaining the required mechanical coupling is shown in FIG. 5 wherein a threaded shaft 84 has a cupped bracket 86, 88 secured at each end thereof. Brackets 86 and 88 are, in turn, secured to shafts 80 and 82 respectively. Although any suitable arrangement could be used to mechanically couple motor 28 and 30 to the switching arrangment, FIG. 5 shows a gear 90 secured to shaft 80 of the control motor engaging a bell gear 92 to rotate a rotary switching plate 94 through additional gears 96 and 98. Plate 94 forms the base structure with console 16 for a rotary arm 100 with the necessary paired contacts of switches 46 and 70 on the rotary arm and the plate.

Operation of system 10 is initiated by moving rotary arm 100 from a position relative to plate 94 at which time switches 46 and 70 of FIG. 2 are closed. Depending on whether the rotary arm is moved clockwise or counter-clockwise, lead 72 is connected to either positive terminal 64 or negative terminal 66, respectively. Motors 28 and 14 rotate clockwise or counter-clockwise, respectively, and motor 30 either assists or resists rotation of the control motor depending on the mechanical loading of the antenna. When plate 94 has reached the radial position corresponding to that of rotary arm 100, switches 46 and 70 open and system 10 is deactivated.

While motors 14 and 28 must have substantially identical speed characteristics, it is also important that the reversibility of each motor provide equality of speed in both directions. In view of the difficulty sometimes encountered in obtaining equivalent clockwise and counter-clockwise speeds with DC motors, FIG. 2 includes speed equalizing circuitry 110 associated with control motor 28. Such a circuit might be used with any DC motor to assume equally reversible speeds. Circuit 110 includes duplicate circuitry corresponding with the two polarities of operation of the motor. Each polarity has a Zener diode $Z_1$ ($Z_2$) to establish a minimum voltage across the motor. For 15 volt DC from supply 26, Zener diodes $Z_1$ and $Z_2$ should conveniently provide 9 volts DC as the base voltage. A diode $D_1$ ($D_2$) in series with the Zener renders each position of the circuit phase conscious. Finally a variable resistor or potentiometer $R_1$($R_2$) and a fixed resistor $R_3$ provide a voltage dividing function to vary the voltage across the motor in the two phases. By adjusting potentiometers $R_1$ and $R_2$, the voltages across motor 28 can be selected to equate the clockwise and counter-clockwise speeds.

Figure 3:
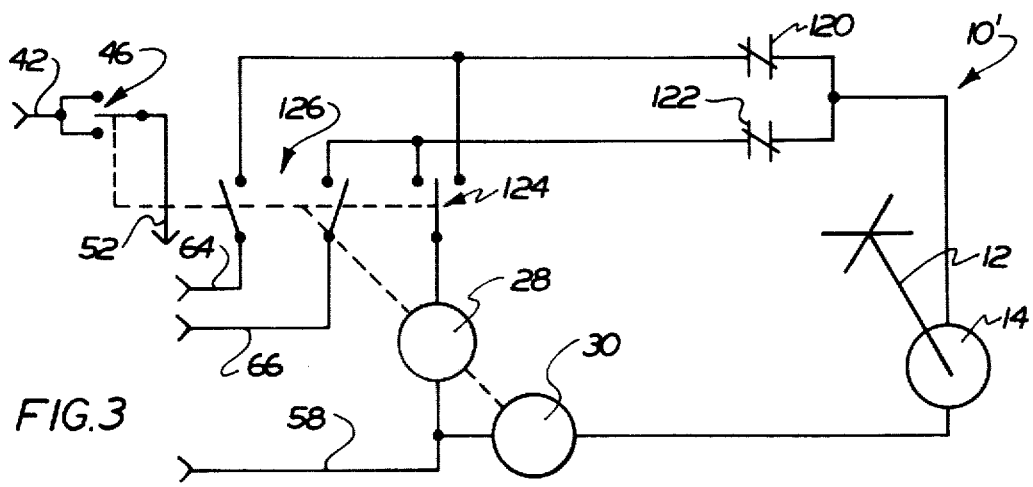
FIG. 3 is an electrical schematic diagram partially illustrating an embodiment of the invention.

Synchronizing the positions of control motor 28 and antenna motor 14 is necessary before accurate operation of system 10 is undertaken to assure that rotary arm 100 (FIG. 5) reflects the true position of antenna 12. Generally, synchronization is accomplished by operating at one motor 14(28) to one of the two extremes of the 360° of travel and causing the other motor 28(14) to operate to the corresponding extreme. FIG. 3 illustrates an arrangement of a system 10' allowing automatic synchronization wherein limit switches 120, 122 corresponding to the extremes of rotation of motor 14 are provided at the remote location. This arrangement requires three conductor connections between remote motor 14 and the console. When motor 14 reaches an extreme, one of normally closed limit switches 120 or 122 opens to disconnect motor 14 from power. Motor 28 continues to be powered until rotary arm 100 and plate 94 align to open a switch 124 which disconnects motor 28, a switch 126 which disconnects the particular polarity of DC power, and switch 46 which disconnects AC power from the system.

Figure 4:
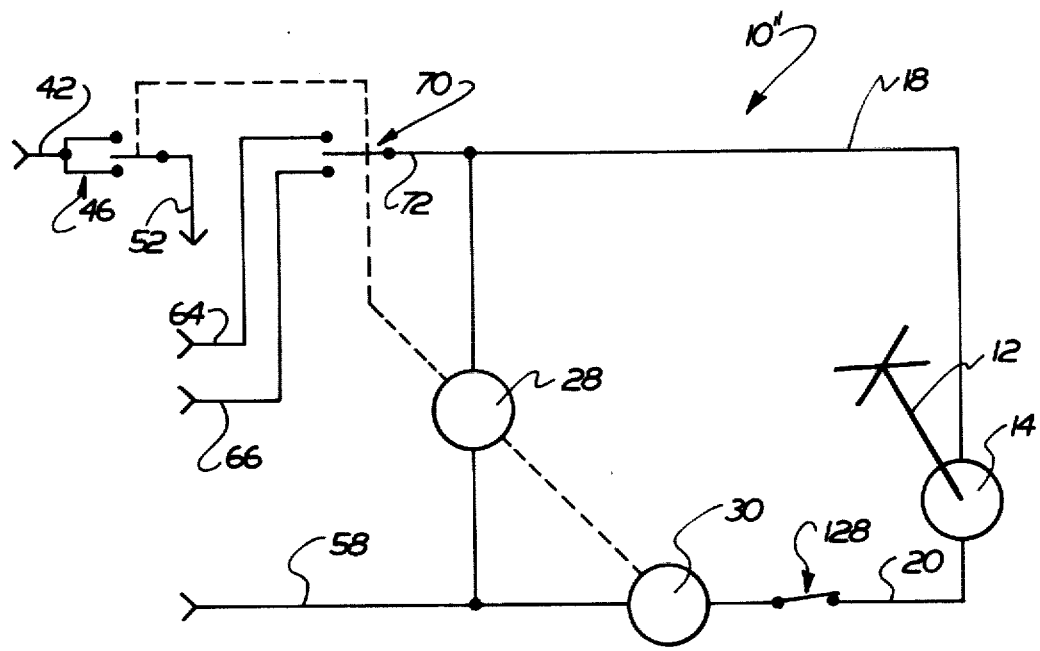
FIG. 4 is an electrical schematic diagram partially illustrating an embodiment of the invention.

In order to provide synchronization while using only two wires to the remote portion, a manual system 10" such as shown in FIG. 4 is used. Operation of system 10" is identical to that described above with regard to FIG. 2, however a normally closed, manually actuated switch 128 is provided within one of the conductors (20) going to the remote portion. To synchronize the system an operator need merely move rotary arm 100 to one of the two extremes. As the system operates to rotate the antenna, the operator manually opens switch 128 when motor 14 reaches the extreme position and motor 28 continues until the corresponding extreme position is reached. If motor 28 shuts off before the antenna reaches the extreme position, the rotary arm is moved to the opposite extreme position and the operation is repeated.

What is claimed is:

1. Antenna positioning apparatus including an antenna unit and a control unit, said apparatus comprising:
    said antenna unit including a rotatable antenna support and a direct-current antenna motor therefor,
    said control unit including a rotary manual control and a rotary follower coaxial therewith, a direct-current control motor coupled to said rotary follower, and switching means controlled jointly by said rotary control and said rotary follower for electrically connecting said motors to a direct-current supply means for operation in corresponding directions when said rotary control and said follower are displaced from a prescribed mutual relationship and so that said follower is operated by said control motor toward establishing said prescribed relationship, said antenna motor and said control motor having substantially identical speed-current characteristics, and
    a direct-current feedback motor responsive to an electrical current in said antenna motor for effecting said control motor variably in dependence on mechanical loading that may be imposed on said antenna motor.

2. The antenna positioning apparatus according to claim 1 wherein said direct-current feedback motor is mechanically coupled to said control motor and has an armature connected in electrical series with said antenna motor.

3. The antenna positioning apparatus according to claim 1 wherein said antenna motor and said feedback motor have similar torque-current curves and said control motor and said feedback motor have at least approximately matched speed-torque curves.

4. Control apparatus for operating a remote antenna, said apparatus comprising: a first reversible motor for rotating said antenna, control means remote from said antenna for controlling the rotation of said antenna, said control means including switch means for activating said control means when a prescribed relationship of said switch means is altered, a second reversible motor coupled to said switch means, said first motor and said second motor having substantially identical speed-current characteristics, a power source energizing said first and second motors in corresponding directions when said prescribed relationship of said switch means is altered, and a feedback motor responsive to the energization of said first motor for effecting said second motor variably in dependence on mechanical loading that may be imposed on said first motor.

5. The control apparatus according to claim 4 wherein said feedback motor is mechanically coupled to said second motor and has an armature connected in electrical series with said first motor.

6. The control apparatus according to claim 4 wherein said switch means includes a rotary manual control and a rotary follower coaxial therewith.

7. The control apparatus according to claim 6 wherein said second motor is mechanically coupled to said rotary follower.

8. The control apparatus according to claim 6 wherein said second motor is electrically coupled to said switch means.

9. The control apparatus according to claim 7 wherein said second motor is electrically coupled to said switch means.

10. The control apparatus according to claim 4 wherein said power source provides direct current power to said first and second motors.

11. The control apparatus according to claim 5 wherein said first motor and feedback motor have similar torque-current curves and said second motor and feedback motor have at least approximately matched speed-torque curves.

12. The control apparatus according to claim 11 wherein said power source provides direct current power to said first and second motors.

* * * * *